United States Patent [19]
Takami et al.

[11] Patent Number: 5,612,155
[45] Date of Patent: Mar. 18, 1997

[54] LITHIUM ION SECONDARY BATTERY

[75] Inventors: Norio Takami; Takahisa Ohsaki, both of Yokohama; Yoshiaki Asami, Niza, all of Japan

[73] Assignees: Kabushiki Kaisha Toshiba, Kawasaki; Toshiba Battery Co, Ltd., Tokyo, both of Japan

[21] Appl. No.: 489,747

[22] Filed: Jun. 13, 1995

[30] Foreign Application Priority Data

Jun. 15, 1994 [JP] Japan .................................. 6-133222

[51] Int. Cl.⁶ .................................................. H01M 4/02
[52] U.S. Cl. ........................ 429/218; 429/194; 429/233
[58] Field of Search ................................ 429/218, 194, 429/233

[56] References Cited

U.S. PATENT DOCUMENTS

| | | |
|---|---|---|
| 4,980,250 | 12/1990 | Takahashi et al. . |
| 5,028,500 | 7/1991 | Fong et al. ................. 429/194 |
| 5,162,170 | 11/1992 | Miyabayashi et al. ................. 429/194 |
| 5,244,757 | 9/1993 | Takami et al. . |
| 5,312,611 | 5/1994 | Takami et al. . |
| 5,340,670 | 8/1994 | Takami et al. . |

FOREIGN PATENT DOCUMENTS

| | | |
|---|---|---|
| 0495613 | 7/1992 | European Pat. Off. . |
| 165857 | 7/1987 | Japan . |

OTHER PUBLICATIONS

Patent Abstracts of Japan, vol. 12, No. 7 (E–571), Jan. 9, 1988, JP–62–165857, Jul. 22, 1987.

Proceedings of the Symposium on High Power Ambient Temperature Lithium Batteries, Oct. 13–17, 1991, pp. 80–89, N. Imanishi, et al., "The Structure and Charge–Discharge Characteristics of Mesophase–Pitch Based Carbons" (month N/A).

*Primary Examiner*—M. Nuzzolillo
*Attorney, Agent, or Firm*—Oblon, Spivak, McClelland, Maier & Neustadt, P.C.

[57] ABSTRACT

A lithium ion secondary battery improved in large-current discharge characteristics, discharge capacity, and cycle life is disclosed. This lithium ion secondary battery includes a positive electrode, a negative electrode comprising a collector and carbon fibers held to the collector for absorbing and desorbing lithium ions, a separator arranged between the positive electrode and the negative electrode, and a non-aqueous electrolyte. The carbon fibers have a radial orientation from an axis of the fibers, and 50 vol % or more of all carbon fibers are arranged such that an angle between an axis of each carbon fiber and a surface of the collector is 45° or less.

15 Claims, 3 Drawing Sheets

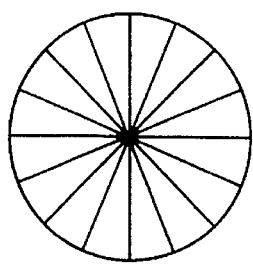 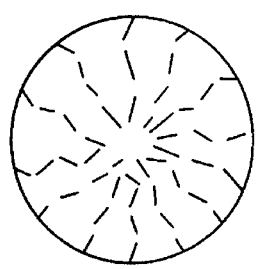 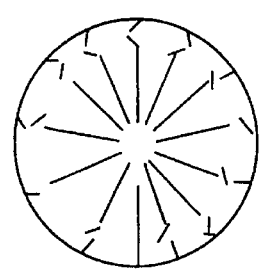
F I G. 2A     F I G. 2B     F I G. 2C
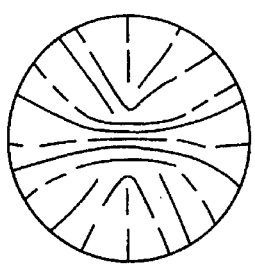 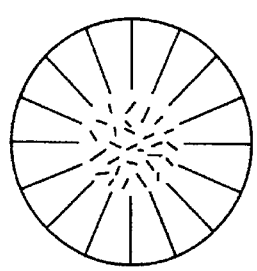
F I G. 2D     F I G. 2E
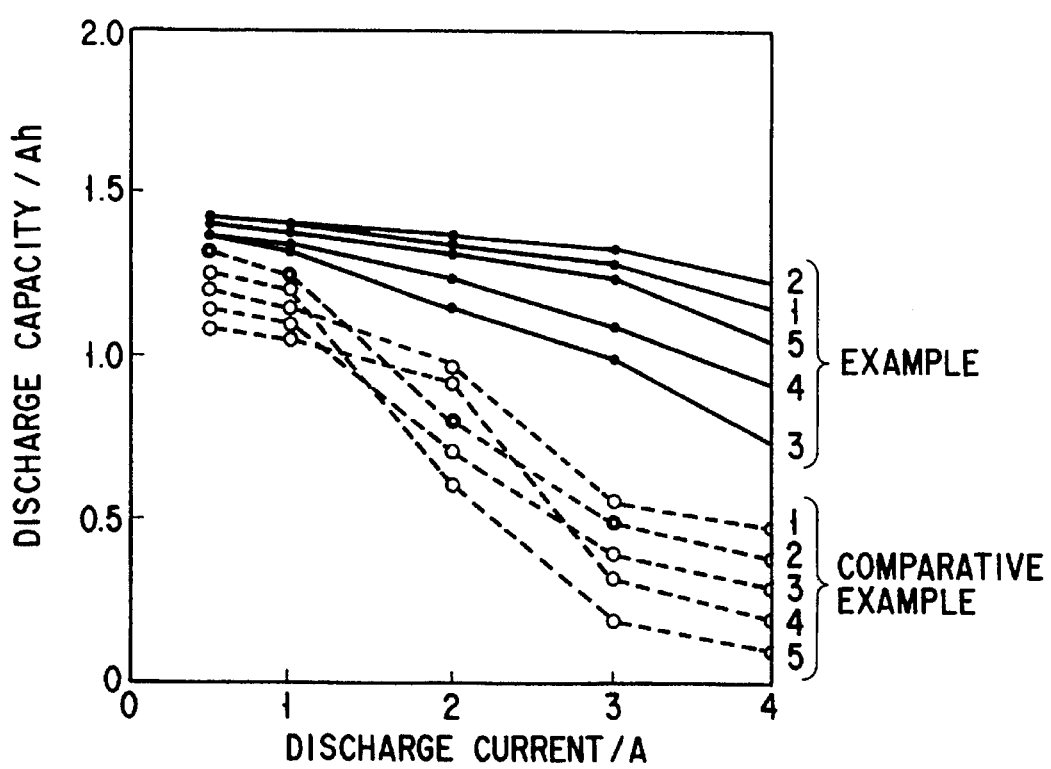
F I G. 3

LITHIUM ION SECONDARY BATTERY

BACKGROUND OF THE INVENTION

1. Field of the Invention

The present invention relates to a lithium ion secondary battery and, more particularly, a lithium ion secondary battery which exhibits excellent battery characteristics by improving the constitution of a negative electrode.

2. Description of the Related Art

Recently, nonaqueous electrolyte batteries using lithium as their negative electrode active materials have attracted attention as high-energy-density batteries. As an example, primary batteries using, e.g., manganese dioxide ($MnO_2$), carbon fluoride [$(CF_2)_n$], and thionyl chloride ($SOCl_2$), as their positive electrode materials are widely used as power sources of calculators and watches and backup batteries of memories.

In addition, with recent reduction in size and weight of various electronic devices, such as VTRs and communication devices, a demand has increasingly arisen for high-energy-density secondary batteries as power sources of these devices. To meet this demand, active researches have been made on lithium secondary batteries using lithium as a negative electrode active material.

These researches have been made on a lithium secondary battery comprising a negative electrode consisting of lithium; a nonaqueous electrolyte, in which a lithium salt, such as $LiClO_4$, $LiBF_4$, or $LiAsF_6$, is dissolved in a nonaqueous solvent, such as propylene carbonate (PC), 1,2-dimethoxyethane (DME), γ-butyrolactone (γ-BL), or tetrahydrofuran (THF), or a lithium-ion-conductive solid electrolytic salt; and a positive electrode containing an active material mainly consisting of a compound which topochemically reacts with lithium, such as $TiS_2$, $MoS_2$, $V_2O_5$, $V_6O_{13}$, and $MnO_2$.

No lithium secondary battery with the above arrangement, however, has been put into practical use. This is so mainly because the charge-discharge efficiency is low and the number of times by which charge and discharge are possible is small (i.e., the cycle life is short). It is considered that the major cause for this is degradation in lithium due to the reaction between lithium of the negative electrode and the nonaqueous electrolyte. That is, the surface of lithium which is dissolved as lithium ions in the nonaqueous electrolyte during discharge is partially inactivated by reacting with the nonaqueous solvent contained in the electrolyte when it precipitates from the nonaqueous electrolyte during charge. As a result, when charge and discharge are repeatedly performed, lithium precipitates into dendrites or globules or is desorbed from a collector of the negative electrode.

For these reasons, lithium ion secondary batteries having negative electrodes containing carbonaceous materials which absorb and desorb lithium ions, such as coke, a resin sintered product, a carbon fiber, and pyrolyric carbon, have been proposed. A lithium ion secondary battery having a negative electrode of this type can reduce degradation in negative electrode characteristics by suppressing the reaction between lithium and the nonaqueous electrolyte and hence the precipitation of dendrites.

It is considered that in the negative electrode containing the above carbonaceous material, absorption and desorption of lithium ions occur in a portion of a structure (graphite structure) in which hexagonal-net-plane layers consisting primarily of carbon atoms are stacked, particularly in portions between these hexagonal-net-plane layers, thereby causing charge and discharge. It is, therefore, required to use a carbonaceous material in which a graphite structure is developed to some extent, as the negative electrode of a lithium ion secondary battery. However, when the carbonaceous material obtained by powdering large size crystals which are highly graphitized is used as a negative electrode in the nonaqueous electrolyte, Li ions are absorbed to the graphite crystal in only one direction and are desorbed from the crystal in the opposite direction. For this reason, a current concentrates on the side portions of the graphite crystals. As a result, the nonaqueous electrolyte is decomposed to decrease the capacity and the charge-discharge efficiency of a battery. In addition, an overvoltage increases in a rapid charge-discharge cycle, so that precipitation of a lithium metal poses a serious problem. Therefore, when a lithium ion secondary battery having the above negative electrode is operated at a high current density, the capacity, charge-discharge efficiency, and the voltage during charge-discharge of the battery decrease significantly. As the charge-discharge cycle progresses, a decrease in capacity becomes large to undesirably shorten the cycle life.

Furthermore, like the negative electrode containing the carbonaceous material obtained by powdering giant crystals, a negative electrode containing a fine powder of carbon fibers which are highly graphitized decomposes the nonaqueous electrolyte, with the result that the performance as the negative electrode is largely degraded.

Jpn. Pat. Appln. KOKAI Publication Nos. 62-268058, 2-82466, 4-61747, 4-115458, 4-184862, and 4-190557 propose control of the degree of graphitization and optimal parameters for graphite structures of various carbonized and graphitized products. However, negative electrodes containing these materials do not necessarily have sufficiently good characteristics. Jpn. Pat. Appln. KOKAI Publication Nos. 4-79170, 4-82172, and 5-325967 disclose carbon fibers used as negative electrodes. These negative electrodes using carbonaceous materials obtained by powdering these carbon fibers have problems on large-current discharge characteristics and the capacity density ($mAh/cm^3$) of the negative electrodes.

SUMMARY OF THE INVENTION

It is an object of the present invention to provide a lithium ion secondary battery having improved large-current discharge characteristics, discharge capacity, and cycle life by improving its negative electrode.

A lithium ion secondary battery according to the present invention comprises:

a positive electrode;

a negative electrode comprising a collector and carbon fibers held to the collector for absorbing and desorbing lithium ions;

a separator arranged between the positive electrode and the negative electrode; and a nonaqueous electrolyte, wherein the carbon fibers have a radial orientation from the axis of the fibers, and 50 vol % or more of all carbon fibers are arranged such that an angle between an axis of each carbon fiber and a surface of the collector is 45° or less.

Additional objects and advantages of the invention will be set forth in the description which follows, and in part will be obvious from the description, or may be earned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 2A to 2E are views illustrating the fine structures of cross sections of carbon fibers according to the present invention;

FIG. 3 is a graph showing the relationship between discharge currents and discharge capacities in lithium ion secondary batteries of Examples 1 to 5 and Comparative Examples 1 to 5.

DETAILED DESCRIPTION OF THE PREFERRED EMBODIMENTS

Figure 1:
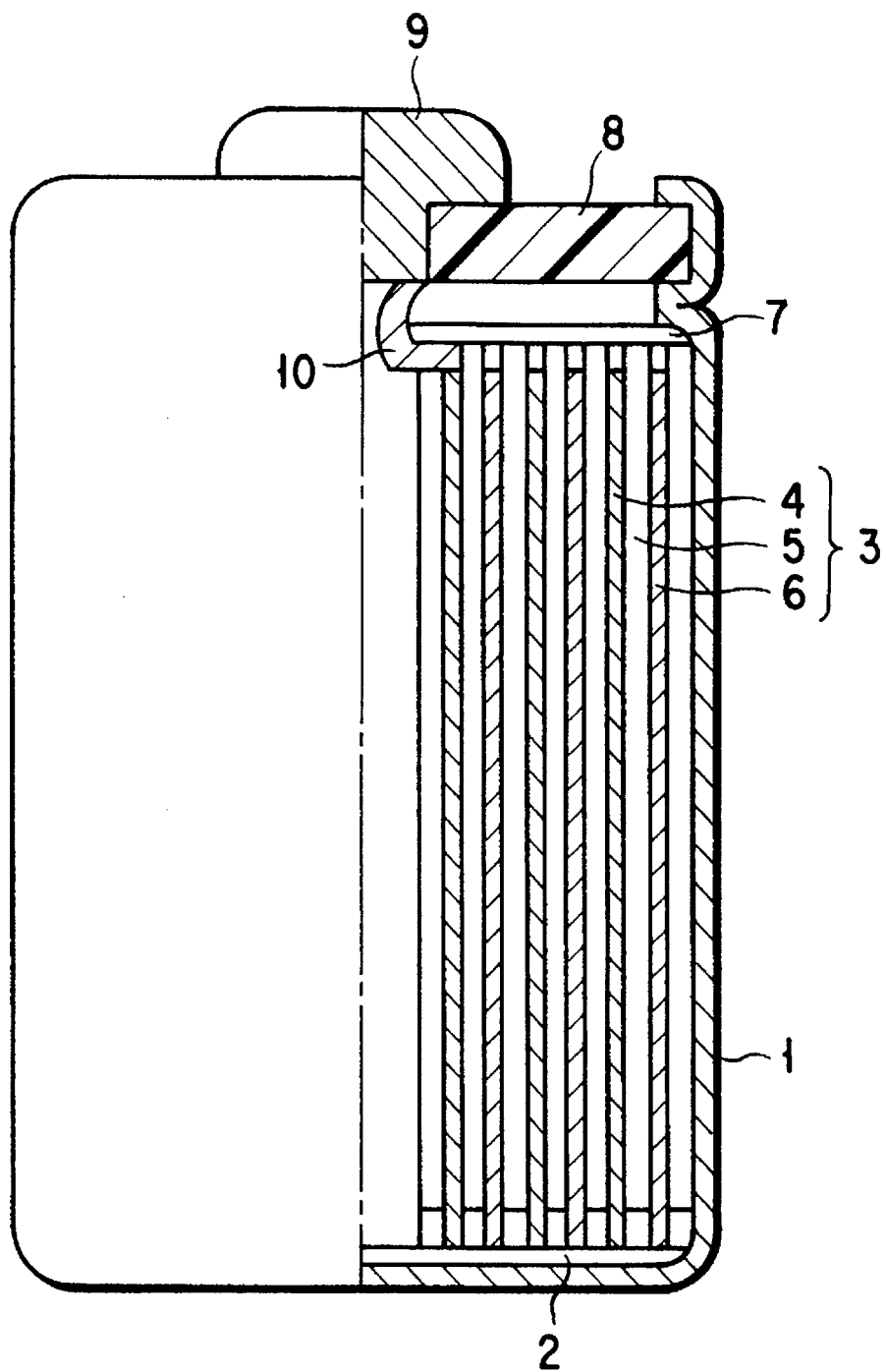
FIG. 1 is a partial sectional view showing a cylindrical lithium ion secondary battery according to the present invention.

A lithium ion secondary battery (e.g., a cylindrical lithium ion secondary battery) according to the present invention will be described in detail with reference to FIG. 1.

An insulator 2 is arranged on the bottom of a cylindrical case 1 having a bottom and consisting of, e.g., stainless steel. An electrode group 3 is housed in the case 1. The electrode group 3 has a structure in which a band-like member formed by stacking a positive electrode 4, a separator 5, and a negative electrode 6 in this order is spirally wound such that the negative electrode 6 is located outside.

An electrolyte is contained in the case 1. Insulating paper 7 having an opening form in its central portion is placed above the electrode group 3 in the case 1. An insulating seal plate 8 is arranged at the upper opening portion of the case 1 and liquid-tightly fixed to the case 1 by caulking the upper opening portion inwardly. A positive electrode terminal 9 is fitted in the central portion of the insulating seal plate 8. One end of a positive electrode lead 10 is connected to the positive electrode 4, and its other end is connected to the positive electrode terminal 9. The negative electrode 6 is connected to the case 1, as a negative electrode terminal, via a negative electrode lead (not shown).

The details of the constitution of the positive electrode 4, the separator 5, the negative electrode 6, and the nonaqueous electrolyte will be described below.
1) Constitution of positive electrode 4

The positive electrode 4 is manufactured by, e.g., suspending an active material, a conductive agent, and a binder in an appropriate solvent, coating the resultant suspension on a collector, and drying the resultant structure into a thin plate.

Examples of the active material are various oxides such as manganese dioxide, a lithium-containing compound, and chalcogen compounds such as titanium disulfide and molybdenum disulfide. Examples of the lithium-containing compound are lithium-manganese composite oxide, lithium-containing nickel oxide, a lithium-containing cobalt compound, lithium-containing nickel-cobalt oxide, lithium-containing iron oxide, and lithium-containing vanadium oxide. Among them all, a secondary battery having a positive electrode containing a lithium-containing compound such as lithium-cobalt oxide ($LiCoO_2$), lithium-nickel oxide ($LiNiO_2$) or lithium-manganese oxide ($LiMn_2O_4$ or $LiMnO_2$) as an active material is preferable because a high voltage can be obtained.

Examples of the conductive agent are acetylene black, carbon black, and graphite.

Examples of the binder are polytetrafluoroethylene (PTFE), polyvinylidene fluoride (PVdF), an ethylene-propylene-diene copolymer (EPDM), and styrene-butadiene rubber (SBR).

The mixing ratios of the active material, the conductive agent, and the binder are preferably 80 to 95 wt % of the active material, 3 to 20 wt % of the conductive agent, and 2 to 7 wt % of the binder.

Preferable examples of the collector are an aluminum foil, a stainless steel foil, and a nickel foil.
2) Separator 5

The separator 5 consists of, e.g., a synthetic resin nonwoven fabric, a polyethylene porous film, or a polypropylene porous film.
3) Negative electrode 6

The negative electrode 6 contains various carbonaceous materials to be described below. La, $d_{002}$, Lc, and an intensity ratio ($P_{101}/P_{100}$) for determining such a carbonaceous material are measured and defined as follows.

(a) All measurement data of X-ray diffraction analysis were obtained by using CuKa, as an X-ray source, and high-purity silicon, as a standard material. A length La of a crystallite in the a-axis direction, a layer spacing $d_{002}$ between (002) planes of the graphite structure, a length Lc of a crystallite in the c-axis direction were calculated from the position and the half width of each diffraction peak. The calculation was performed by a half-width mid-point method.

(b) The length La of the crystallite in the a-axis direction and the length Lc of the crystallite in the c-axis direction were values obtained when K, as a form factor of a Scherrer's equation, was 0.89.

(c) The intensity ratio $P_{101}/P_{100}$ of a (101) diffraction peak $P_{101}$ to a (100) diffraction peak $P_{100}$ obtained by X-ray diffraction analysis was calculated from the height ratio of the peaks.

Figure 4:
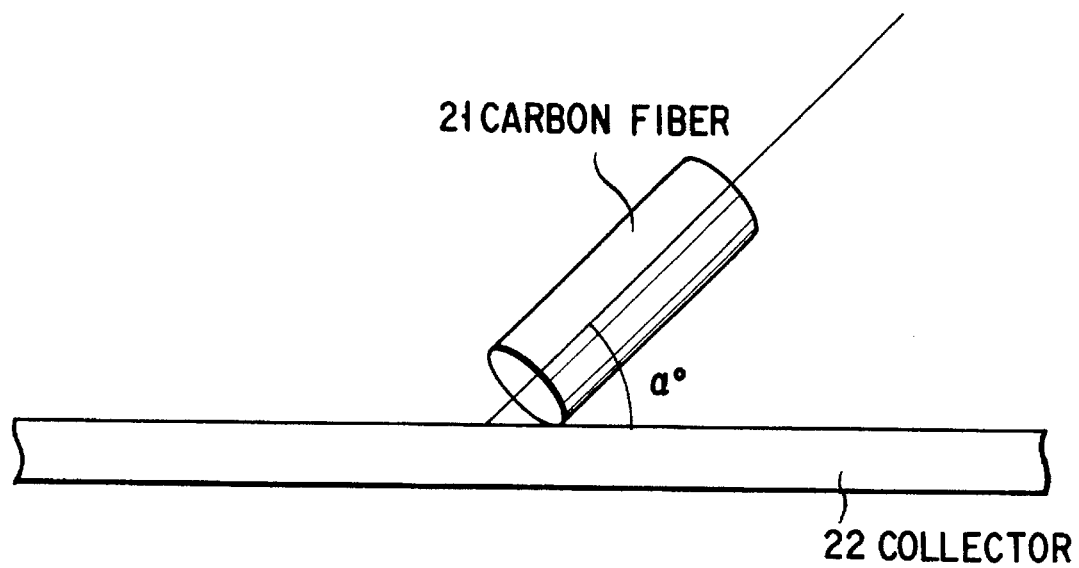
FIG. 4 is a view illustrating the state in which a carbon fiber is arranged such that an angle between an axis of the carbon fiber and a surface of a collector is 45° or less.

The negative electrode 6 comprises a collector and carbon fibers held to the collector for absorbing and desorbing lithium ions. The carbon fibers have a radial orientation from an axis of the fibers. At the same time, 50 vol % or more of all carbon fibers are arranged such that an angle a between an axis of each carbon fiber 21 and a surface of the collector 22 is 45° or less, as shown in FIG. 4.

The term "carbon fiber having a radial orientation from an axis of the fiber" means a carbon fiber which comprises graphite crystallites each having a hexagonal-net-plane graphite layer structure, and in which the layer spacing of each of at least those graphite crystallites in the surface region of the fiber opens at least to the circumferential surface of the fiber. Through the layer spacing lithium ions can be easily absorbed to and desorbed from the fiber.

In a lithium ion secondary battery having this negative electrode 6, the discharge capacity, the large-current discharge characteristics, and the cycle life can be improved. More specifically, the carbon fibers having a radial orientation from the axis of the fibers has a large number of Li ion absorption/desorption reaction points on its side. 50 vol % or more of all carbon fibers are arranged such that the angle between the axis of each fiber and the surface of the collector is 45° or less. The actual area of the side which contributes to the absorption/desorption reaction of lithium ions can be sufficiently assured. For this reason, the number of absorption/desorption reaction points of the lithium ions on the surface of the negative electrode can increase. As a result, the discharge capacity of the secondary battery having the negative electrode can be improved. Since the number of lithium ions absorbed to and desorbed from the side of the carbon fibers is large, the negative electrode can greatly increase the desorption rate of lithium ions. The negative electrode can absorb and desorb a large number of lithium ions. At the same time, since the desorption rate of lithium ions is high, the negative electrode can greatly improve the large-current discharge characteristics of the secondary battery. In addition, since it is possible to absorb a large number of lithium ions to the negative electrode and desorb them therefrom for a long period of time, the cycle life of the secondary battery can be greatly prolonged.

When the content of carbon fibers having the angle of 45° or less is less than 50 vol %, the absorption of Li ions to, and desorption of Li ions from, the side of the carbon fibers are inhibited to impair the large-current discharge characteristics of the secondary battery. The content of carbon fibers, which satisfies the angular range, is preferably 70 vol % or more. In addition, the content of carbon fibers having the angle of 15° or less is 50 vol % or more, and more preferably 70 vol % or more.

The carbon fibers each must have a radial orientation from the axis of the fiber. The fine structures of the cross sections of the carbon fibers, as shown in FIGS. 2A to 2E, respectively. The carbon fiber having appropriate irregularities in orientations of graphite crystals in the surface region, central region, or entire region of its fiber, as shown in FIGS. 2B to 2E, is also included in the carbon fibers of the present invention. For this reason, the radial orientations include a lamella orientation and a Brooks-Taylor type orientation. Such carbon fibers having an appropriate irregularity in orientation have a high strength, and those structure rarely deteriorates upon absorption and desorption reactions of Li ions. These carbon fibers are preferable to prolong the cycle life. More preferable is carbon fibers which have an irregular radial orientation in their central region, and in which the layer spacing of each of the graphite crystallites in the surface region of the fiber opens at least to the circumferential surface of the fiber. The fine structure of the cross section of such a carbon fiber is exemplified in FIG. 2D or 2E. Li ions can be easily absorbed to and desorbed from the side in this carbon fiber, so that the large-current discharge characteristics and the cycle life characteristics can be improved. Note that carbon fibers having a coaxially tubular (onion type) orientation from the axis of the fibers may avoid internal diffusion of lithium ions.

The carbon fibers preferably have an average fiber length of 10 to 100 μm, an average fiber diameter of 1 to 20 μm, an average aspect ratio (fiber length/fiber diameter) of 2 to 10, and a specific surface area of 0.1 to 5 m²/g. When the average aspect ratio of the carbon fibers is less than 2, the cross sections of the fibers exposed to the surface of the negative electrode may increase. As a result, in the absorption/desorption reaction of the Li ions, a ratio of absorption/desorption reaction at the cross sections of the fibers increases to lower the movement of Li ions into the carbon fibers, thereby degrading the large-current discharge characteristics. As the ratio of the absorption/desorption of Li ions at the cross sections of the fibers increases, a current concentrates on the cross sections. For this reason, the electrolyte may be decomposed to decrease charge-discharge efficiency. It is also difficult to increase the bulk density of the carbon fibers in the negative electrode to be 1.3 g/cm³ or more. However, when the average aspect ratio of the carbon fibers exceeds 10, the fibers tend to pass through the separator to cause short-circuiting between the positive electrode and the negative electrode.

The carbon fibers preferably have characteristics (1) to (3) as follows.

(1) The carbon fibers preferably have a peak intensity ratio ($P_{101}/P_{100}$) of a (101) diffraction peak $P_{101}$ to a (100) diffraction peak $P_{100}$ in X-ray diffraction to be 1.2 or more. The carbon fiber having this peak intensity ratio and a radial orientation increases the number of sites, through which lithium ions are absorbed and desorbed. The large-current discharge characteristics of a lithium ion secondary battery having a negative electrode containing the above carbon fibers can be greatly improved. The carbon fiber having the ratio $P_{101}/P_{100}$ of 1.2 or more has a graphite-layered structure developed to a proper degree and the number of Li ion absorption sites increases. Therefore, the capacity of the negative electrode increases.

If the ratio $P_{101}/P_{100}$ is less than 1.2, the graphite-layered structure will be distorted, and large activation energy will be required to diffuse Li ions into the carbon fiber. The secondary battery will inevitably fail to have large-current discharge characteristics. A preferable ratio $P_{101}/P_{100}$ falls within the range of 1.8 to 2.6.

A mesophase pitch (optically anisotropic pitch) as a material is spun into short fibers each having a length of 100 to 1000 μm. A treatment of imparting infusibility to these short fibers is performed, and the resultant fibers are carbonized at a temperature of 300° to 800° C. The carbonized fibers are then pulverized. The pulverized product is then graphitized at a temperature of 2,500° C. or more, thereby obtaining the carbon fibers having the above peak intensity ratio. In this manufacturing process, the conditions for the spinning operation and the treatment of imparting infusibility to the short fibers are optimized to obtain the carbon fibers.

(2) The carbon fibers are carbon fibers in which a layer spacing $d_{002}$ is 0.3354 to 0.3370 mm, and more preferably 0.3354 to 0.3359 mm, the length La is 60 nm or more, and the length Lc is 40 nm or more. These carbon fibers can increase the number of Li ion absorption sites, and therefore the capacity of the negative electrode containing the carbon fibers can increase.

(3) The carbon fibers are carbon fibers having an exothermic peak of 800° C. or more in the differential thermal analysis in air. These carbon fibers can reduce the contents of amorphous carbon and fine fibers produced in the pulverization. Therefore, a lithium ion secondary battery having a negative electrode containing these carbon fibers can improve charge-discharge efficiency and storage characteristics.

The strength of the negative electrode may decrease when the carbon fibers are aligned. For this reason, it is preferable to mix fine carbon particles of any shape other than a fiber-shape in the carbon fibers. Examples of the fine carbon particles are spherical carbon particles, thin-strip carbon particles, or a mixture of spherical carbon particles and thin-strip carbon particles. A negative electrode containing such fine carbon particles is improved in conductivity and contact between the carbon fibers, and a contact force between the carbon fibers and the collector. The mechanical strength and utilization efficiency of the negative electrode can increase, accordingly. As a result, the capacity of a lithium ion secondary battery having the negative electrode can increase.

The fine carbon particles are preferably a carbonized or graphitized product having, e.g., an average particle size of 5 to 30 μm, i.e., a smaller average particle size than that of the carbon fibers. Carbon particles satisfying this condition typically exhibit the above action. In particular, preferable examples of the carbonized or graphitized product are mesophase spherical carbon, coke, a CVD carbon product, artificial graphite, and natural graphite. Such a carbonized or graphitized product serves as not only a conductive material but also a negative electrode active material for absorbing and desorbing Li ions. The carbonized and graphitized products preferably have a layer spacing $d_{002}$ of 0.3354 nm or more and less than 0.370 nm, respectively. In addition, the fine carbon particles preferably have characteristics as described in (1) and (3) above.

A mixing ratio of the fine carbon particles to the carbon fibers preferably falls within the range of 2 to 30 wt % due to the following reason. When the mixing ratio is less than 2 wt %, the utilization efficiency of the negative electrode and the mechanical strength may be reduced. However, if the mixing ratio exceeds 30 wt %, the large-current discharge characteristics may be degraded. A more preferable mixing ratio of the fine carbon particles is 4 to 15 wt %.

The negative electrode 6 is manufactured by the following method in practice. More specifically, a carbonaceous material containing the carbon fibers is suspended in an appropriate solvent together with a binder, and this suspension is coated and dried on a collector. The collector is subjected to multistage pressing two to five times at a desired pressure to obtain the negative electrode 6. By this multistage pressing, 50 vol % or more of all carbon fibers are arranged such that the angle between an axis of each carbon fiber and the surface of the collector is 45° or less.

Examples of the binder are polytetrafluoroethylene (PTFE), polyvinylidene fluoride (PVdF), an ethylene-propylene-diene copolymer (EPDM), styrene-butadiene rubber (SBR), and carboxymethyl cellulose (CMC).

The mixing ratios of the carbonaceous material and the binder are preferably 90 to 98 wt % of the carbonaceous material and 2 to 10 wt % of the binder. In particular, the carbonaceous material is contained in an amount of preferably 5 to 20 mg/cm² when the negative electrode 6 is completed.

Examples of the collector are a copper foil, a stainless steel foil, and a nickel foil.

4) Nonaqueous electrolyte

The nonaqueous electrolyte is prepared by dissolving an electrolytic salt in a nonaqueous solvent.

The nonaqueous solvent is not particularly limited, and so any nonaqueous solvent known as a solvent for a lithium ion secondary battery can be used. It is, however, preferable to use a nonaqueous solvent substantially consisting of a solvent mixture of ethylene carbonate (EC) and at least one nonaqueous solvent (to be referred to as a second solvent hereinafter), which has a melting point lower than that of ethylene carbonate and has a donor number of 18 or less. Such a nonaqueous solvent is stable with respect to the carbonaceous material with a developed graphite structure, which constitutes a negative electrode, and hardly causes reductive or oxidative decomposition of the nonaqueous electrolyte. This nonaqueous solvent also has an advantage of a high conductivity.

A nonaqueous electrolyte singly containing ethylene carbonate has an advantage in that it is hardly reductively decomposed with respect to the graphitized carbonaceous material, but disadvantageously has a high melting point (39° C. to 40° C.) and a low conductivity. This electrolyte is not suitable for a secondary battery operated at room temperature. The second solvent mixed with ethylene carbonate makes it possible to reduce the viscosity of the solvent mixture lower than that of the ethylene carbonate, thereby improving the conductivity. The use of the second solvent (the donor number of ethylene carbonate is 16.4) having the donor number of 18 or less makes selective solvation of ethylene carbonate to lithium ions easily. It is therefore assumed that the reduction reaction of the second solvent is suppressed with respect to the carbonaceous material having the developed graphite structure. When the donor number of the second solvent is set to 18 or less, the oxidative decomposition potential is set 4 V or more with respect to the lithium electrode. Therefore, a high-voltage lithium ion secondary battery can be advantageously realized.

The second solvent preferably consists of chainlike carbonate. Examples of the second solvent are dimethyl carbonate (DMC), methyl ethyl carbonate (MEC), diethyl carbonate (DEC), propylene carbonate (PC), γ-butyrolactone (γ-BL), acetonitrile (AN), ethyl acetate (EA), toluene, xylene, methyl acetate (MA), ethyl prpionate, and methyl propionate. These second solvents can be used singly or in the form of a mixture of two or more types of them. In particular, the second solvent preferably has a donor number of 16.5 or less.

The viscosity of the second solvent is preferably 28 mp or less at 25° C.

The mixing amount of ethylene carbonate in the solvent mixture is preferably 10% to 80% as a volume ratio. If the mixing amount falls outside this range, reduction in conductivity or decomposition of the solvent may occur to decrease the charge-discharge efficiency. The mixing amount of ethylene carbonate is more preferably 20% to 75% as a volume ratio. The conductivity of the electrolyte can be increased by increasing the mixing amount of ethylene carbonate in the nonaqueous solvent to 20 vol % or more.

A more preferable composition of the above solvent mixture is a combination of EC and MEC, a combination of EC, PC, and MEC, a combination of EC, MEC, and DEC, a combination of EC, MEC, and DMC, or a combination of EC, MEC, PC, and DEC. The volume ratio of MEC is preferably set to 30 to 70 vol %. By setting the volume ratio of MEC to 30 to 70%, and preferably 40 to 60%, the conductivity can increase. The electrolyte containing the solvent mixture is particularly effective to a negative electrode in which the carbon fibers are arranged such that the angle between the axis of each fiber and the surface of the collector is 45° or less. On the other hand, to suppress the reductive decomposition reaction of the solvent, use of an electrolyte dissolved with carbon dioxide gas ($CO_2$) can effectively increase the capacity and prolong the cycle life.

Examples of main impurities present in the above solvent mixture (nonaqueous solvent) are water and organic peroxides (e.g., glycols, alcohols, and carboxylic acids). It is considered that each of these impurities forms an insulating film on the surface of a graphitized carbons, increasing the interfacial resistance of an electrode. Therefore, these impurities may cause a decrease in cycle life or capacity. In addition, self-discharge during storage at high temperatures (60° C. or more) may also increase. For these reasons, the amount of these impurities in an electrolyte containing the nonaqueous solvent is preferably decreased as small as possible. More specifically, it is preferable that the content of water be 50 ppm or less and the content of the organic peroxides be 1,000 ppm or less.

Examples of the electrolytic salt contained in the above nonaqueous electrolyte are lithium salts, such as lithium perchlorate ($LiClO_4$), lithium phosphate hexafluoride ($LiPF_6$), lithium borofluoride ($LiBF_4$), arsenolithium hexafluoride ($LiAsF_6$), lithium trifluoromethanesulfonate ($LiCF_3SO_3$), and lithium bistrifluoromethylsulfonylimide [$LiN(CF_3SO_2)_2$]. Among these lithium salts, $LiPF_6$, $LiBF_4$, and $LiN(CF_3SO_2)_2$ are preferable. These electrolytic salts have advantages in stability with respect to the carbonaceous material and a longer cycle life.

The dissolution amount of the electrolytic salt in the nonaqueous solvent is preferably 0.5 to 2.0 mols/l.

The cylindrical lithium ion secondary battery shown in FIG. 1 will be described in more detail by way of examples of the present invention.

EXAMPLE 1

91 wt % of a lithium-cobalt oxide ($Li_xCoO_2$ ($0.8 \leq x \leq 1$)) powder were mixed with 3.5 wt % of acetylene black, 3.5 wt % of graphite, and 2 wt % of an ethylene-propylene-diene monomer powder in toluene. The resultant mixture was coated on an aluminum foil (30 μm) as a collector, and the aluminum foil was pressed to obtain a positive electrode.

A mesophase pitch obtained from a petroleum pitch with low sulfur (content: 8,000 ppm or less) was spun into fibers, and a treatment of imparting infusibility to these fibers was performed. The fibers were then carbonized in an argon atmosphere at 600° C. and appropriately pulverized such that 90 vol % of the fibers having an average fiber diameter of 11 μm and a particle size of 1 to 80 μm was present and the number (5% or less) of particles having a particle size of 0.5 μm or less was small. The pulverized fibers were graphitized in an inert gas atmosphere at 3,000° C., thereby manufacturing graphitized fibers (mesophase pitch carbon fibers).

The resultant mesophase pitch carbon fibers had an average fiber diameter of 7 μm, an average fiber length of 40 μm, and an average particle size of 20 μm. The carbon fibers were distributed at a ratio of 90 vol % or more within the range of 1 to 80 μm in a particle size distribution, and the particle size distribution of the particles with a particle size of 0.5 μm or less was 0 vol %. A specific surface area was 1.2 $m^2/g$ according to a BET method using $N_2$ gas absorption. An intensity ratio ($P_{101}/P_{100}$) was 2.3 according to X-ray diffraction, $d_{002}$ was 0.3357 nm, Lc was 80 nm, and La was 100 nm or more. The sulfur content in the carbon fibers was 100 ppm or less. In addition, the oxygen content was 100 ppm or less, the nitrogen content was 100 ppm or less, and each of the Fe and Ni contents was 1 ppm. With SEM observation, the graphite crystal orientation was found to belong to the radial orientation shown in FIG. 2B. Since the orientation was slightly irregular, there were no omissions in the carbon fibers. The exothermic peak in the differential thermal analysis in air was 810° C.

96.7 wt % of the mesophase pitch carbon fibers were mixed with 2.2 wt % of styrene-butadiene rubber and 1.1 wt % of carboxymethyl cellulose, and the resultant mixture was coated and dried on a copper foil as a collector. At this time, the bulk density was 1.1 $g/cm^3$. The copper foil was pressed four times to obtain a negative electrode. The surface of the resultant negative electrode was observed with an SEM photograph. 80 vol % of all carbon fibers were arranged in such a manner that the angle between the axis of each carbon fiber and the surface of the collector is 45° or less. The bulk density of the negative electrode after the last pressing operation was 1.4 $g/cm^3$.

The positive electrode, a separator consisting of a polyethylene porous film, and the negative electrode were stacked in this order, and the resultant structure was spirally wound such that the negative electrode was located outside, manufacturing an electrode group.

Separately, lithium phosphate hexafluoride ($LiPF_6$) was dissolved in an amount of 1.2 mol/l in a solvent mixture (mixing volume ratio: 40:40:20) of ethylene carbonate (EC), methyl ethyl carbonate (MEC), and diethyl carbonate (DEC), preparing a nonaqueous electrolyte.

The electrode group and the electrolyte were placed in a cylindrical case having a bottom and consisting of stainless steel, thereby assembling the cylindrical lithium ion secondary battery shown in FIG. 1.

EXAMPLE 2

A carbonaceous material obtained by mixing a mesophase pitch carbon fibers as in Example 1 with fine artificial graphite particles (thin-strip particles; average particle size of 10 μm; $d_{002}$=0.3355 nm; $P_{101}/P_{100}$=3.5), which was obtained by graphitizing petroleum coke at 3,000° C., at a weight ratio of 9:1 was used to form a negative electrode following the same procedures as in Example 1. 90 vol % of all carbon fibers were present in the resultant negative electrode such that the angle between the axis of each carbon fiber and the surface of the collector is 45° or less. A cylindrical lithium ion secondary battery shown in FIG. 1 was assembled using this negative electrode as in Example 1.

EXAMPLE 3

A carbonaceous material obtained by mixing a mesophase pitch carbon fibers as in Example 1 with fine carbon particles (spherical particles; average particle size of 5 μm; $d_{002}$=0.336 nm; $P_{101}/P_{100}$=2), which was obtained by graphitizing mesophase pitch spherical carbons in oxidation at 2,800° C., at a weight ratio of 7:3 was used to form a negative electrode following the same procedures as in Example 1. 65 vol % of all carbon fibers were present in the resultant negative electrode such that the angle between the axis of each carbon fiber and the surface of the collector is 45° or less. A cylindrical lithium ion secondary battery shown in FIG. 1 was assembled using this negative electrode as in Example 1.

EXAMPLE 4

A carbonaceous material obtained by mixing a mesophase pitch carbon fibers as in Example 1 with fine petroleum coke particles (spherical particles; average particle size of 8 μm; $d_{002}$=0.350 nm; Lc=17 nm; $P_{101}/P_{100}$=0), which was obtained by graphitizing a petroleum pitch at 1,000° C., at a weight ratio of 95:5 was used to form a negative electrode following the same procedures as in Example 1. 70 vol % of all carbon fibers were present in the resultant negative electrode such that the angle between the axis of each carbon fiber and the surface of the collector is 45° or less. A cylindrical lithium ion secondary battery shown in FIG. 1 was assembled using this negative electrode as in Example 1.

EXAMPLE 5

A carbonaceous material obtained by mixing a mesophase pitch carbon fibers as in Example 1 with fine artificial graphite particles (thin-strip particles; average particle size of 10 µm; $d_{002}=0.3355$ nm; $P_{101}/P_{100}=3.5$), which was obtained by graphitizing petroleum coke at 3,000° C., at a weight ratio of 9:1 was used to form a negative electrode following the same procedures as in Example 1 except that multistage pressing was performed three times. 65 vol % of all carbon fibers were present in the resultant negative electrode such that the angle between the axis of each carbon fiber and the surface of the collector is 45° or less. A cylindrical lithium ion secondary battery shown in FIG. 1 was assembled using this negative electrode as in Example 1.

Comparative Example 1

A negative electrode was formed following the same procedures as in Example 1 except that a graphitized mesophase pitch carbon fibers ($d_{002}=0.3367$ nm; $Lc=100$ nm; $P_{101}/P_{100}=2.4$), which was present at 90 vol % or more within a particle size distribution of 1 to 30 µm with an average fiber diameter of 7 µm and an average fiber length of 10 µm, was used, and pressing was performed only once. 30 vol % of all carbon fibers were present in the resultant negative electrode such that the angle between the axis of each carbon fiber and the surface of the collector is 45° or less. A cylindrical lithium ion secondary battery shown in FIG. 1 was assembled using this negative electrode as in Example 1.

Comparative Example 2

A negative electrode was formed following the same procedures as in Example 1 except that fibers of a CVD carbon product ($d_{002}=0.3356$ nm; $Lc \geq 100$ nm; $La \geq 100$ nm; $P_{101}/P_{100}=2.4$), which was graphitized at 3,000° C. and present at 90 vol % or more within a particle size distribution of 1 to 10 µm with an average fiber diameter of 3 µm and an average fiber length of 3 µm, had a coaxially tubular (onion type) orientation. 10 vol % of all fibers were present in the result negative electrode such that the angle between the axis of each fiber and the surface of the collector is 45° or less. A cylindrical lithium ion secondary battery shown in FIG. 1 was assembled using this negative electrode as in Example 1.

Comparative Example 3

A carbonaceous material obtained by mixing a mesophase pitch carbon fibers as in Example 1 with carbon (spherical particles; average particle size of 5 µm; $d_{002}=0.336$ nm; $P_{101}/P_{100}=2$), which was obtained by graphitizing mesophase pitch spherical carbons whose surface layers were removed in oxidation at 2,800° C., at a weight ratio of 4:6 was used to form a negative electrode following the same procedures as in Example 1. 20 vol % of all carbon fibers were present in the resultant negative electrode such that the angle between the axis of each carbon fiber and the surface of the collector is 45° or less. A cylindrical lithium ion secondary battery shown in FIG. 1 was assembled using this negative electrode as in Example 1.

Comparative Example 4

A negative electrode was formed using a mesophase pitch carbon fibers ($d_{002}=0.3375$ nm; $Lc=20$ nm; $La=40$ nm; $P_{101}/P_{100}=1$) which was obtained by spinning a mesophase pitch as a material into long fibers, performing a treatment of imparting infusibility to the resultant long fibers, and graphitizing the fibers at 3,000° C. and had a coaxially tubular (onion type) orientation partially. 80 vol % of all carbon fibers were present in the resultant negative electrode such that the angle between the axis of each carbon fiber and the surface of the collector is 45° or less. A cylindrical lithium ion secondary battery shown in FIG. 1 was assembled using this negative electrode as in Example 1.

Comparative Example 5

A cylindrical lithium ion secondary battery shown in FIG. 1 was assembled following the same procedures as in Example 1, except that a negative electrode was formed using artificial graphite ($d_{002}=0.3355$ nm; $Lc>100$ nm; $La>100$ nm; $P_{101}/P_{100}=3.5$) powder (lamella orientation; thin-strip particles; average particle size of 10 µm).

The lithium ion secondary batteries of Examples 1 to 5 and Comparative Examples 1 to 5 were charged up to 4.2 V at a charge current of 1 A for 2.5 hours, and the discharge rate characteristics were compared with each other up to 2.7 V within the range of 0.5 to 3 A. The results are shown in FIG. 3.

As can be apparent from FIG. 3, the lithium ion secondary batteries of Examples 1 to 5 are found to have larger capacities and better large-current discharge characteristics than the batteries of Comparative Examples 1 to 5.

In a 1 A charge-discharge cycle test, 85 to 95% of the initial capacities of the secondary batteries of Examples 1 to 5 were maintained in 500 cycles. In contrast to this, only 40 to 70% of the initial capacities of the secondary batteries of Comparative Examples 1 to 5 were maintained in 500 cycles in a similar test. Therefore, it is found that the secondary batteries of Examples 1 to 5 have much better cycle characteristics than those of Comparative Examples 1 to 5.

In the above examples, the present invention is applied to the cylindrical lithium ion secondary batteries. However, the present invention is also applicable to a rectangular parallelepiped lithium ion secondary battery. The electrode group stored in the case of the battery is not limited to a spiral shape. In addition, a positive electrode, a separator, and a negative electrode may be stacked in this order.

As has been described above, according to the present invention, there is provided a lithium ion secondary battery which has a large capacity and is excellent in large-current discharge characteristics and cycle life.

Additional advantages and modifications will readily occur to those skilled in the art. Therefore, the invention in its broader aspects is not limited to the specific details, and representative devices and 10 shown and described herein. Accordingly, various modifications may be made without departing from the spirit or scope of the general inventive concept as defined by the appended claims and their equivalents.

What is claimed is:

1. A lithium ion secondary battery comprising:

a positive electrode;

a negative electrode comprising a collector and carbon fibers held to said collector for absorbing and desorbing lithium ions;

a separator arranged between said positive electrode and said negative electrode; and a nonaqueous electrolyte, wherein said carbon fibers have a radial orientation from an axis of the fibers, and at least 50 vol % of all carbon fibers are arranged such that an angle between an axis of each carbon fiber and a surface of said collector is 45° or less.

2. The secondary battery according to claim 1, wherein said angle is 15° or less.

3. The secondary battery according to claim 1, wherein carbon fibers having said angle occupy at least 70 vol % of all carbon fibers.

4. The secondary battery according to claim 1, wherein said carbon fibers have an average fiber length of 10 to 100 μm, an average fiber diameter of 1 to 20 μm, and an average aspect ratio of 2 to 10 which is represented by a ratio of a fiber length to a fiber diameter.

5. The secondary battery according to claim 1, wherein said carbon fibers have an irregularity in orientation of the graphite crystal.

6. The secondary battery according to claim 1, wherein said negative electrode further comprises fine carbon particles of any shape other than a fiber-shape.

7. The secondary battery according to claim 6, wherein said fine carbon particles are spherical carbon particles or thin-strip carbon particles.

8. The secondary battery according to claim 6, wherein a mixing ratio of said fine carbon particles to said carbon fibers is 2 to 30 wt %.

9. The secondary battery according to claim 1, wherein said carbon fibers have a peak intensity ratio $P_{101}/P_{100}$ of a (101) diffraction peak $P_{101}$ to a (100) diffraction peak $P_{100}$ according to an X-ray diffraction method to be not less than 1.2.

10. The secondary battery according to claim 1, wherein said carbon fibers have a layer spacing ($d_{002}$) of (002) planes of a graphite structure of 0.3354 to 0.3370 nm, which is measured by X-ray diffraction, a length La of a crystallite in an a-axis direction of not less than 60 nm, and a length Lc of a crystallite in a c-axis direction of not less than 40 nm.

11. The secondary battery according to claim 1, wherein said carbon fibers have an exothermic peak of not less than 800° C. in a differential thermal analysis.

12. The secondary battery according to claim 1, wherein said negative electrode is formed by preparing a suspension containing said carbon fibers, coating the suspension on said collector, drying the resultant, and performing multistage pressing two to five times at a desired pressure.

13. The secondary battery according to claim 1, wherein an active material for said positive electrode is a lithium-containing compound.

14. The secondary battery according to claim 1, wherein said nonaqueous electrolyte comprises a solvent mixture and a lithium salt dissolved in said solvent mixture, and said solvent mixture comprises ethylene carbonate and at least one nonaqueous solvent having a melting point lower than the ethylene carbonate and a donor number of not more than 18.

15. The secondary battery according to claim 14, wherein said nonaqueous solvent comprises a compound selected from the group consisting of propylene carbonate, dimethyl carbonate, methyl ethyl carbonate and diethyl carbonate.

* * * * *